US011794915B2

(12) United States Patent
Churchill et al.

(10) Patent No.: US 11,794,915 B2
(45) Date of Patent: Oct. 24, 2023

(54) METHOD AND SYSTEM FOR A TWO-MOTOR PROPULSION SYSTEM FOR AN ELECTRIC AIRCRAFT

(71) Applicant: BETA AIR, LLC, South Burlington, VT (US)

(72) Inventors: David L. Churchill, Winooski, VT (US); Brian O. Klinka, Rockport, MA (US); Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/730,365

(22) Filed: Apr. 27, 2022

(65) Prior Publication Data

US 2022/0340292 A1 Oct. 27, 2022

Related U.S. Application Data

(60) Provisional application No. 63/180,155, filed on Apr. 27, 2021.

(51) Int. Cl.
*B64D 27/24* (2006.01)
*B64C 29/00* (2006.01)
(Continued)

(52) U.S. Cl.
CPC ............. *B64D 27/24* (2013.01); *B60L 15/20* (2013.01); *B64C 29/0008* (2013.01);
(Continued)

(58) Field of Classification Search
CPC ........ B64D 27/24; B64D 33/08; B64D 35/08; B64D 47/00; B60L 15/20; B60L 2200/10; B64C 29/0008
See application file for complete search history.

(56) References Cited

U.S. PATENT DOCUMENTS 4,590,413 A * 5/1986 Gritter .................... B60L 50/51
318/803
8,727,271 B2 * 5/2014 Salyer ..................... B64C 27/14
244/17.11
(Continued)

FOREIGN PATENT DOCUMENTS

WO 2008079148 7/2008

OTHER PUBLICATIONS

Marian Blachuta *, Robert Bieda and Rafal Grygiel, Sampling Rate and Performance of DC/AC Inverters with Digital PID Control—A Case Study, Sep. 21, 2021.
(Continued)

*Primary Examiner* — Medhat Badawi
(74) *Attorney, Agent, or Firm* — CALDWELL INTELLECTUAL PROPERTY LAW

(57) ABSTRACT

Aspects relate to an electric aircraft having a two-motor propulsion system and methods for use. An exemplary electric aircraft includes a flight component attached to the electric aircraft, where the flight component is configured to generate thrust, a first electric motor and a second electric motor, where each of the first electric motor and the second electric motor are mechanically connected to the flight component and configured to provide motive power to the flight component, and the second electric motor is able to provide motive power to the flight component if the first electric motor is inoperative.

16 Claims, 5 Drawing Sheets

(51) Int. Cl.
  *B64D 35/08*    (2006.01)
  *B64D 33/08*    (2006.01)
  *B60L 15/20*    (2006.01)
  *B64D 47/00*    (2006.01)

(52) U.S. Cl.
  CPC ............ *B64D 33/08* (2013.01); *B64D 35/08* (2013.01); *B64D 47/00* (2013.01); *B60L 2200/10* (2013.01)

(56) References Cited

U.S. PATENT DOCUMENTS

| | | | | |
|---|---|---|---|---|
| 9,007,005 | B2* | 4/2015 | Sung | B60L 15/007 318/400.07 |
| 9,036,371 | B2* | 5/2015 | Baarman | H02M 3/33576 363/16 |
| 9,193,451 | B2* | 11/2015 | Salyer | B64C 37/00 |
| 9,479,095 | B2* | 10/2016 | Sankaran | B60L 50/61 |
| 9,664,012 | B2* | 5/2017 | Deutch | E21B 43/11 |
| 10,027,262 | B2* | 7/2018 | Wolf | H02P 27/085 |
| 10,259,340 | B1* | 4/2019 | Wolf | B60L 15/007 |
| 10,500,965 | B2* | 12/2019 | Wang | H02P 27/08 |
| 10,608,505 | B1* | 3/2020 | Long | H02K 15/14 |
| 10,686,385 | B2* | 6/2020 | Brown | H02M 1/083 |
| 11,040,632 | B2* | 6/2021 | Ge | B60L 53/22 |
| 11,177,746 | B1* | 11/2021 | Szmuk | H02P 6/30 |
| 2010/0080027 | A1* | 4/2010 | Wiegman | H02J 1/102 363/126 |
| 2010/0080030 | A1* | 4/2010 | Wiegman | B60L 58/20 363/131 |
| 2013/0106106 | A1* | 5/2013 | Andujar | F15B 1/265 290/43 |
| 2015/0115108 | A1* | 4/2015 | Benson | B64D 27/24 244/53 R |
| 2016/0033970 | A1* | 2/2016 | Henderson | B60L 13/04 701/22 |
| 2016/0077142 | A1* | 3/2016 | Kanayama | G01R 31/42 324/750.3 |
| 2017/0217600 | A1* | 8/2017 | Regev | B64C 27/14 |
| 2019/0144126 | A1* | 5/2019 | Groninga | B64C 29/0033 244/53 B |
| 2020/0079515 | A1* | 3/2020 | Latulipe | B64D 27/10 |
| 2020/0079521 | A1* | 3/2020 | Latulipe | B64D 35/00 |
| 2020/0083791 | A1* | 3/2020 | Latulipe | H02K 41/03 |
| 2020/0108919 | A1* | 4/2020 | Sada | B64C 27/02 |
| 2020/0328714 | A1* | 10/2020 | Tripathi | H03M 3/438 |
| 2021/0221526 | A1* | 7/2021 | Van Bavel | B64D 27/02 |
| 2021/0229825 | A1* | 7/2021 | Eppink | B64C 11/00 |
| 2021/0245629 | A1* | 8/2021 | Klimpel | B60L 58/33 |
| 2022/0063819 | A1* | 3/2022 | Murrow | B64D 27/24 |
| 2022/0234749 | A1* | 7/2022 | Shi | B64D 31/06 |
| 2022/0258873 | A1* | 8/2022 | Bernard | B64D 35/02 |
| 2022/0302801 | A1* | 9/2022 | Osama | H02K 11/21 |
| 2022/0306289 | A1* | 9/2022 | Asanuma | B64C 13/16 |
| 2022/0340292 | A1* | 10/2022 | Churchill | B64D 47/00 |

OTHER PUBLICATIONS

"Review of Aircraft Electric Power Systems and Architectures" Zhao, Xin; Guerrero, Josep M.; Wu, Xiaohao, Abstract; p. 3; p. 5. Jul. 10, 2014, A ZH.

* cited by examiner

METHOD AND SYSTEM FOR A TWO-MOTOR PROPULSION SYSTEM FOR AN ELECTRIC AIRCRAFT

CROSS-REFERENCE TO RELATED APPLICATIONS

This application is claiming the benefit of priority, of U.S. Provisional Application No. 63/180,155 filed on Apr. 27, 2021 and entitled "METHOD AND SYSTEM FOR A TWO MOTOR PROPULSION SYSTEM FOR AN ELECTRIC AIRCRAFT," the entirety of which is incorporated herein by reference.

FIELD OF THE INVENTION

The present invention generally relates to the field of propulsion for electric aircraft. In particular, the present invention is directed to a method and system for a two-motor propulsion system for an electric aircraft.

BACKGROUND

Electric aircraft are presently not commonplace, while electric automobiles are increasingly more so. Aircraft have exceedingly high safety standards, which must be met for certification.

SUMMARY OF THE DISCLOSURE

In an aspect, an electric aircraft having a two-motor propulsion system includes a flight component attached to the electric aircraft, where the flight component is configured to generate thrust, a first electric motor and a second electric motor, where each of the first electric motor and the second electric motor are mechanically connected to the flight component and configured to provide motive power to the flight component, and the second electric motor is able to provide motive power to the flight component if the first electric motor is inoperative.

In another aspect, a method of using an electric aircraft include generating thrust, using a flight component attached to the electric aircraft, providing motive power to the flight component, using a first electric motor and a second electric motor, and providing motive power to the flight component, using the second electric motor, if the first electric motor is inoperative.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a two-motor propulsion system of an electric aircraft. Propulsion systems are utilized in an electric aircraft to power a flight component, such as a propulsor, to achieve a desired movement, such as torque and/or attitude, of an electric aircraft. In an embodiment, a two-motor propulsion system includes two motors that provide redundant flight control of flight component of a propulsor, where if one motor of the two-motor propulsion system fails, the other motor may operate the propulsion assembly. Aspects of the present disclosure can be used to disengage the connection with the failure struck electric motor and continue to power the flight component of the aircraft utilizing the second electric motor.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting.

Figure 1A:
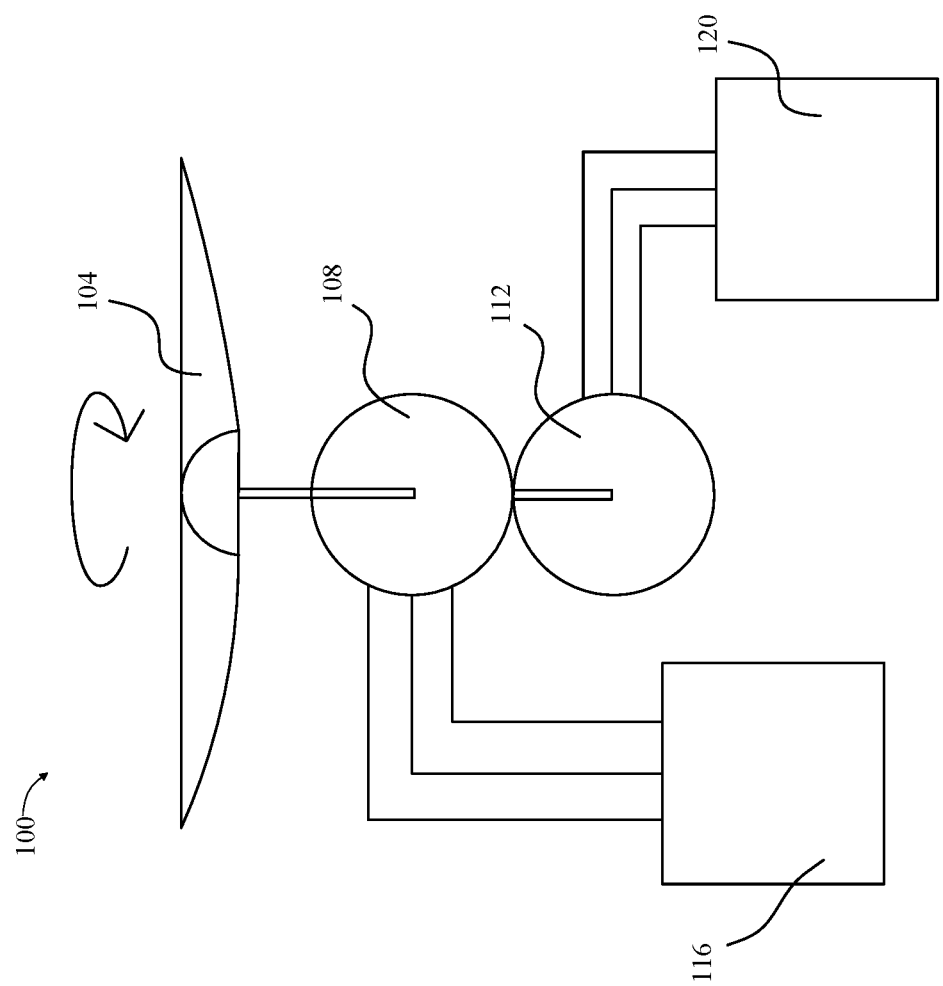
FIG. 1A is a block diagram of an exemplary embodiment of the two-motor propulsion system in accordance with one or more embodiments of the present disclosure.

Referring now to FIG. 1A, an exemplary embodiment of a two-motor propulsion system 100 for an electric aircraft is shown in accordance with one or more embodiments of the present disclosure. An electrically-powered aircraft may include an electric vertical takeoff and landing (eVTOL) aircraft, as discussed further in this disclosure. Electric aircraft may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

During flight, a number of forces may act upon the electric aircraft. Forces acting on an aircraft during flight may include thrust, the forward force produced by the rotating element of the aircraft and acts parallel to the longitudinal axis. Drag may be defined as a rearward retarding force which is caused by disruption of airflow by any protruding surface of the aircraft such as, without limitation, the wing, rotor, and fuselage. Drag may oppose thrust and acts rearward parallel to the relative wind. Another force acting on aircraft may include weight, which may include a combined load of the aircraft itself, crew, baggage and fuel. Weight may pull aircraft downward due to the force of gravity. An additional force acting on aircraft may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Still referring now to FIG. 1A, system 100 includes flight component 104. As used in this disclosure, "flight component" is any component and/or device used to propel an electric aircraft by using, moving, or rotating foils, such as one or more rotors, an airscrew or propeller, a set of airscrews or propellers such as contra-rotating propellers, a control surface, such as a moving or flapping wing, or the like. Further, a thrust element, for example, can include without limitation a marine propeller or screw, an impeller, a turbine, a pump-jet, a paddle or paddle-based device, or the like. Flight component 104 may be in any location on the electric aircraft. For example and without limitation, in an embodiment, there may be a flight component located on each corner of the electric aircraft. Persons skilled in the art, upon reviewing the entirety of this disclosure, will be aware of various devices that may be used as a flight component consistently with this disclosure.

In one or more embodiments, a flight component may include any aerodynamic surface attached to an aircraft that interacts with forces to move the aircraft through a medium. A flight component may include, as a non-limiting example, ailerons, flaps, leading edge flaps, rudders, elevators, spoilers, slats, blades, stabilizers, stabilators, airfoils, a combination thereof, or any other moveable surface used to control an aircraft in a fluid medium.

In one or more embodiments flight component 104 may include a propulsor. For the purposes of this disclosure, a "propulsor" is a component or device used to propel a craft by exerting force on a fluid medium, which may include a gaseous medium such as air or a liquid medium such as water. Propeller 108 may include any device or component that consumes electrical power on demand to propel an electric aircraft in a direction while on ground or in-flight. For example, and without limitation, propulsor may include a rotor, propeller, paddle wheel, and the like thereof. In an embodiment, propulsor may include a plurality of blades that radially extend from a hub of the propulsor so that the blades may convert a rotary motion from a motor into a swirling slipstream. In an embodiment, blade may convert rotary motion to push an aircraft forward or backward. For instance, and without limitation, propulsor 108 may include an assembly including a rotating power-driven hub, to which several radially-extending airfoil-section blades are fixedly attached thereto, where the whole assembly rotates about a central longitudinal axis A. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates. In one or more exemplary embodiments, propulsor 108 may include a vertical propulsor or a forward propulsor. A forward propulsor may include a propulsor configured to propel aircraft 144 in a forward direction. A vertical propulsor may include a propulsor configured to propel aircraft 144 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In one or more embodiments, propulsor 108 can include a thrust element which may be integrated into the propulsor. The thrust element may include, without limitation, a device using moving or rotating foils, such as one or more rotors, an airscrew, or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. In one or more embodiments, propulsor 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force electric aircraft 144 in a horizontal direction along a longitudinal axis of electric aircraft 144. As a further non-limiting example, pusher component may twist and/or rotate to pull air behind it and, at the same time, push electric aircraft 144 forward with an equal amount of force. In an embodiment, and without limitation, the more air forced behind aircraft, the greater the thrust force with which electric aircraft 144 is pushed horizontally will be. In another embodiment, and without limitation, forward thrust may force electric aircraft 144 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Further, in an embodiment, system 100 includes first electric motor 108 and second electric motor 112 mechanically coupled to flight component 104. As used in this disclosure, "mechanically coupled" may include any means of mechanical fastening and/or connection. Mechanical coupling may include, for example and without limitation, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. First electric motor 108 may include any electric motor as described in the entirety of this disclosure. Second electric motor 112 may include any electric motor as described in the entirety of this disclosure. As used in this disclosure a "electric machine" is a source that may power flight component 104 to propel aircraft 144 through a fluid medium, like air, generating lift. For instance, and without limitation, electric machine may include a device that converts electrical power into movement, such as and for example, mechanical movement. Electric machine may include without limitation, any electric motor, where an electric motor is a device that converts electrical energy into mechanical energy, for instance by causing a shaft to rotate, as discussed further in FIG. 1B.

An electric motor may be driven by direct current (DC) electric power; for instance, a motor may include a brushed DC motor or the like. An electric motor may be driven by electric power having varying or reversing voltage levels, such as alternating current (AC) power as produced by an alternating current generator and/or inverter, or otherwise varying power. An electric motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that an electric motor may take or exemplify as consistent with this disclosure. First electric motor 108 and second electric motor 112 are both configured to command and/or power flight component 104. In an embodiment and without limitation, first electric motor 108 and second electric motor 108 may both continuously command flight component 104 and/or pulse between first electric motor 108 commanding flight component 104 and second electric motor 112 commanding flight component 104. For example and without limitation, in an embodiment, first electric motor 108 and/or second electric motor 112 may act as a flight control system and/or flight controller.

Figure 1B:
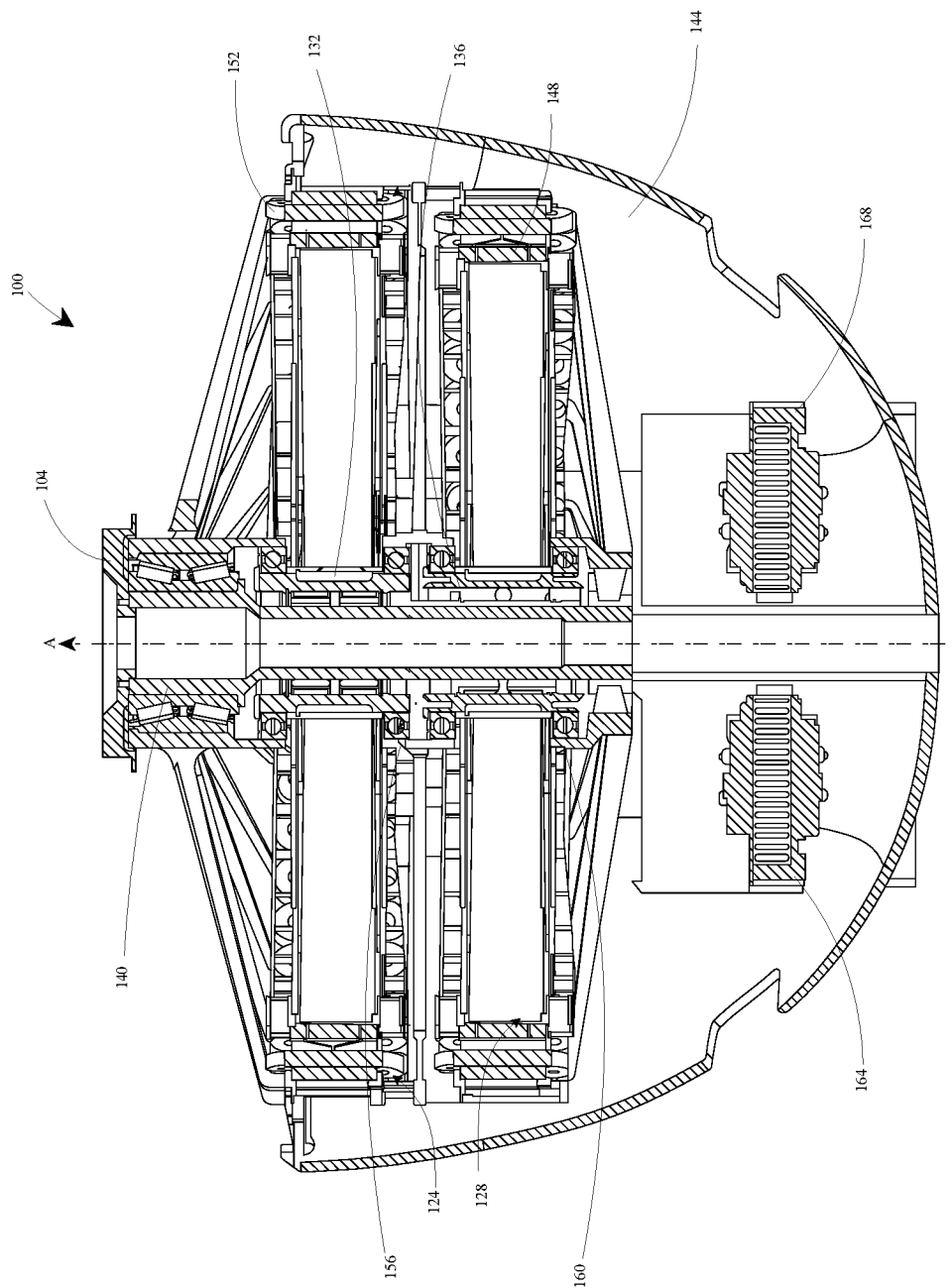
FIG. 1B is an illustration of a cross-sectional view of an exemplary embodiment of the two-motor propulsion system in accordance with one or more embodiments of the present disclosure.

Additionally, in an embodiment, first electric motor 104 and second electric motor 108 may be configured in any orientation. For example and without limitation, in an embodiment, first electric motor 104 and second electric motor 108 are stacked, wherein a single shaft connects first electric motor 108 and second electric motor 112 to flight component 104 (as shown in FIG. 1B). First electric motor 108 may be configured to include at least a winding wound about a mandrel. The at least a winding may include electrically conductive material. Electrically conductive material may include any material that is conductive of electrical current and may include, as a non-limiting example, various metals such as copper, steel, or aluminum, carbon conducting materials, or any other suitable conductive material. Persons skilled in the art, upon reviewing the entirety of this disclosure, will be aware of various forms of electrically conductive material that may be used as windings on a mandrel consistent with the described methods and systems. Additional disclosure may be found in U.S. non-provisional patent application Ser. No. 17/563,498 filed on Dec. 28, 2021 and entitled "ELECTRIC AIRCRAFT LIFT MOTOR WITH AIR COOLING," U.S. nonprovisional patent application Ser. No. 17/704,798 filed on Mar. 25, 2022 and entitled "ROTOR FOR AN ELECTRIC AIRCRAFT MOTOR," and U.S. non-provisional application Ser. No. 17/702,069 filed on Mar. 23, 2022, and entitled "DUAL-MOTOR PROPULSION ASSEMBLY," the entirety of each of which is incorporated herein by reference, in its entirety.

With continued reference to FIG. 1A, in some embodiments, one or both of first electric motor 104 and second electric motor 108 may be air cooled. For instance, in some embodiments, one or more of rotor and/or stator of motor (e.g., motor windings or other current carrying conductors) may be cooled with air. In some cases, cooling may be by way of natural convection. Alternatively or additionally, in some cases, cooling may be by way of forced convection. In some cases, forced convection may occur through passive airflow. Alternatively and/or additionally, in some cases, forced convection may occur through airflow actively generated, for example, without limitation with a fan. Passive airflow may include apparent wind resulting from relative movement of aircraft in air. Active airflow may include airflow generated by one or more of a propulsor (of the aircraft) and/or a dedicated cooling fan and/or cooling pump. In some cases, a flow of cooling air may be directed for example by way of a duct and/or a diverter. An exemplary duct includes without limitation a National Advisory Committee for Aeronautics (NACA) duct. Additional disclosure related to cooling of electric motors includes disclosure from U.S. nonprovisional patent application Ser. No. 16/910,255, Ser. No. 17/563,498, and Ser. No. 17/704,798 filed on Jun. 24, 2020, Dec. 28, 2021, Mar. 25, 2022, and entitled "INTEGRATED ELECTRIC PROPULSION ASSEMBLY," "ELECTRIC AIRCRAFT LIFT MOTOR WITH AIR COOLING," and "ROTOR FOR AN ELECTRIC AIRCRAFT MOTOR," respectively, each of which is incorporated by disclosure in its entirety.

Continuing to refer to FIG. 1A, system 100 includes a first electrical component 116 connected to first electric motor 108 and a second electrical component 120 connected to second electric motor 112. As described in this disclosure, an "electrical component" is any device and/or component associated with an energy source. For example, and without limitation, first electrical component 116 may include a first inverter, and second electrical component 120 may include a second inverter, as discussed further in this disclosure. In another example, and without limitation, first electrical component 116 may include a first energy source, and second electrical component 120 may include a second energy source. As used in this disclosure an "energy source" is a device that is capable of providing energy to an electric motor and/or flight component. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft. For example and without limitation, in an embodiment first electrical component 116 and/or second electrical component 120 may be a high voltage electrical busbar. As a further example and without limitation, in an embodiment first electrical component 116 and/or second electrical component 120 may be any component of the flight control system. Persons skilled in the art, upon reviewing the entirety of this disclosure, will be aware of various devices and/or components that may be used as electrical components consistent with the described methods and systems.

In one or more embodiments, energy source may include a battery pack. A battery pack may include a power source that may be configured to store electrical energy in the form of a plurality of battery modules, which themselves include of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" may be used to describe a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term "wired," but one of ordinary skill in the art would appreciate that this term is synonymous with "electrically connected," and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack may include 196 battery cells in series and 18 battery cells in parallel. This is, as someone of ordinary skill in the art would appreciate, is only an example and battery pack may be configured to have a near limitless arrangement of battery cell configurations.

In one or more embodiments, battery pack may include a plurality of battery modules. The battery modules may be wired together in series and/or in parallel. Battery pack may include a center sheet which may include a thin barrier. The barrier may include a fuse connecting battery modules on either side of the center sheet. The fuse may be disposed in or on the center sheet and configured to connect to an electric circuit having a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may include a thermal fuse, mechanical fuse, blade fuse, expulsion fuse, spark gap surge arrestor, varistor, or a combination thereof. Battery pack may also include a side wall includes a laminate of a plurality of layers configured to thermally insulate the plurality of battery modules from external components of battery pack. The side wall layers may include materials which possess characteristics suitable for thermal insulation as described in the entirety of this disclosure like fiberglass, air, iron fibers, polystyrene foam, and thin plastic films, to name a few. The side wall may additionally or alternatively electrically insulate the plurality of battery modules from external components of battery pack and the layers of which may include polyvinyl chloride (PVC), glass, asbestos, rigid laminate, varnish, resin, paper, Teflon, rubber, and mechanical lamina. The center sheet may be mechanically coupled to the side wall in any manner described in the entirety of this disclosure or otherwise undisclosed methods, alone or in combination. The side wall may include a feature for alignment and coupling to the center sheet. This feature may include a cutout, slots, holes, bosses, ridges, channels, and/or other undisclosed mechanical features, alone or in combination.

Still referring to FIG. 1A, energy source may be used to provide a steady supply of electrical power to one or more components of electric aircraft during operation. Energy source may supply electrical power to electric motors 108, 112, such as motors, which operate to move one or more flight components, such as lift components and/or one or more pusher components, of electric aircraft to drive one or more blades, or the like thereof. Motor(s) may be driven by direct current (DC) electric power and may include, without limitation, brushless DC electric motors, switched reluctance motors, induction motors, or any combination thereof. Motor(s) may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Figure 2:
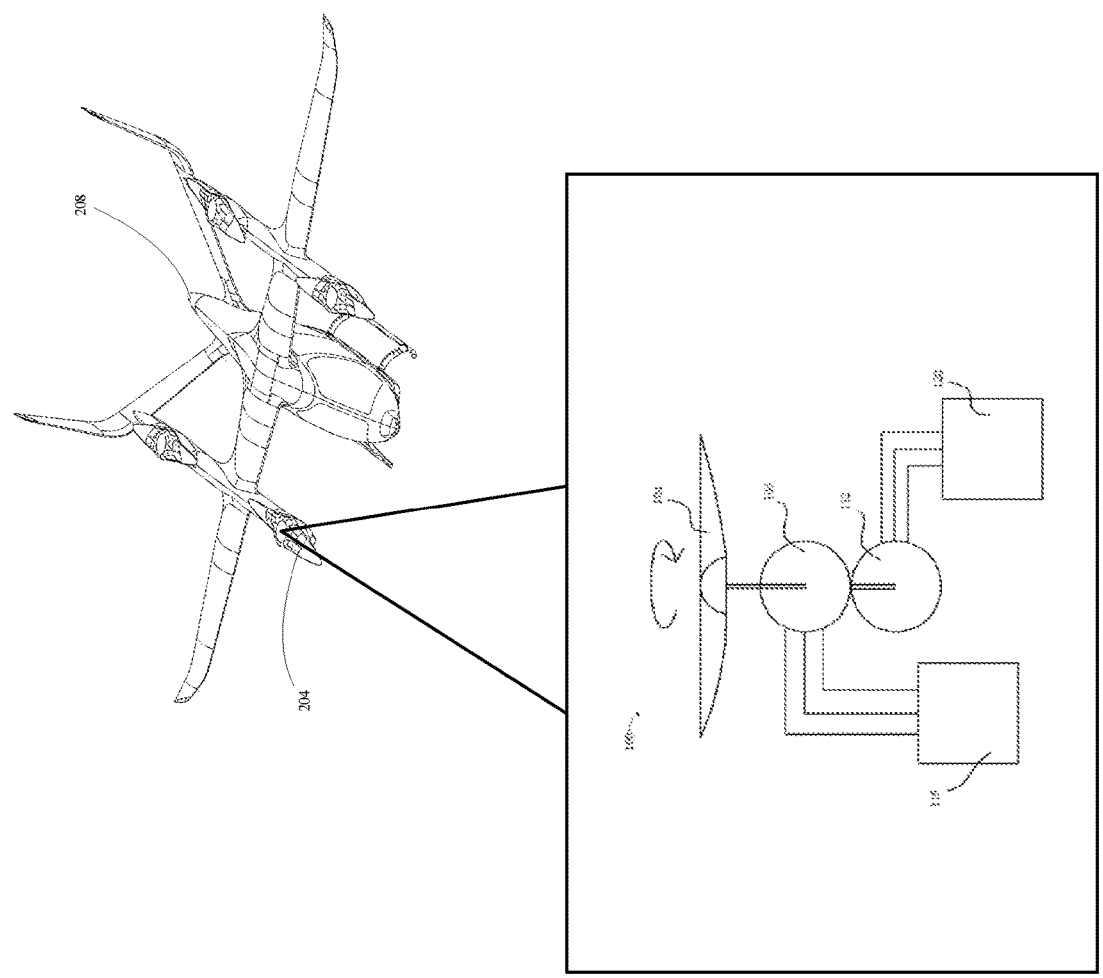
FIG. 2 is an illustration of an exemplary embodiment of the two-motor propulsion system of an electric aircraft.

Now referring to FIG. 1B, an exemplary embodiment of electric motors are shown in accordance with one or more embodiments of the present disclosure. In one or more nonlimiting embodiments, electric motors 124, 128 may include a plurality of motors, which includes a first motor 124 and a second motor 128 (also referred to herein in the singular as "motor" or plural as "motors"). Each motor 124, 128 may be mechanically connected to flight component 104, such as propulsor (as shown in FIG. 2), of electric aircraft 144. As previously mentioned, motors 124, 128 are each configured to convert an electrical energy and/or signal into a mechanical movement of a flight component 104. For example, and without limitation, a rotor shaft 140 of one or more motors may be rotated to rotate propulsor about a longitudinal axis A of shaft 140. In one or more embodiments, motors 124, 128 may be driven by direct current (DC) electric power. For instance, and without limitation, a motor may include a brushed DC motor or the like. In one or more embodiments, motors 116,120 may be a brushless DC electric motor, a permanent magnet synchronous motor, a switched reluctance motor, and/or an induction motor. In other embodiments, motors 124, 128 may be driven by electric power having varying or reversing voltage levels, such as alternating current (AC) power as produced by an alternating current generator and/or inverter, or otherwise varying power, such as produced by a switching power source. For example, and without limitation, system 100 may include a first inverter 164 and a second inverter 168 that provide varying electric power to motors 124, 128, respectively. Persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and/or dynamic braking.

In one or more embodiments, each motor 124, 128 may include a rotor 148 coaxial disposed within a stator 152. As understood by one skilled in the art, a rotor is a portion of an electric motor that rotates with respect to a stator, which remains stationary relative to a corresponding electric aircraft. In one or more embodiments, system 100 may include shaft 140 that extends through each motor 124,128. Motors 124,128 may be arranged such that one motor may be stacked atop the other motor. For example, and without limitation, first motor 124 and second motor 128 may share an axis, such as, for example, motors 124,128 may be coaxially positioned along longitudinal axis A of shaft 140 while first motor 124 may be positioned closer to a flight component than second motor 128 along longitudinal axis A. In one or more embodiments, system 100 may include a clutch. For example, and without limitation, each motor 124,128 may each include a clutch 132,136, respectively, that engages or disengages shaft 140 upon receipt of a command from a controller and/or pilot control, as discussed further in this disclosure. Each clutch 132,136 may include an electro-mechanical clutch. In one or more embodiments, clutches 132,136 may be configured to engage or disengage a power transmission to each motor 124,128, respectively. In one or more embodiments, a clutch may include a sprag clutch, electromagnetic clutch, a sacrificial weak component to break at a threshold torque, one-time breakaway clutch, such as a shearing element that would break free at a designated torque, and/or any other clutch component.

Further, in an embodiment, system 100 includes a first clutch component connected to the first electric motor 108 and a second clutch component connected to the second electric motor 112. As described in the entirety of this disclosure, a "clutch component" is a device configured to disengage the electric motor in the event of a failure. For example and without limitation, the clutch component may include a sprag clutch, electromagnetic clutch, a sacrificial weak component to break at a threshold torque, one-time breakaway clutch, such as a shearing element that would break free at a designated torque, and/or any other clutch component. For example and without limitation, in an embodiment when the first electric motor 108 experiences a failure, the first clutch component may disengage the first electric motor 108. As a further example and without limitation, in an embodiment when second electric motor 112 experiences a failure, the second clutch component may disengage the second electric motor 112. The first clutch component and/or second clutch component may include a sensor to monitor any status and/or component of system 100, as discussed further in this disclosure. Persons skilled in the art, upon reviewing the entirety of this disclosure, will be aware of various devices and/or components that may be used as clutch components consistent with the described methods and systems.

Still referring to FIG. 1B, two-motor propulsion system 100 may include a controller. In one or more embodiments, controller may be communicatively connected to the electric motors, such as motors. For example, and without limitation, controller may be communicatively connected to each motor 124,128. In other embodiments, controller may be communicatively connected to each clutch 132,136. In one or more embodiments, controller may be communicatively connected to a pilot control. In one or more embodiments, controller may be communicatively connected to one or more sensors of electric aircraft that are configured to monitor a condition of one or more components of system 100. For the purposes of this disclosure, "communicatively connected" is a process whereby one device, component, or circuit is able to receive data from and/or transmit data to another device, component, or circuit. A communicative connection may be performed by wired or wireless electronic communication; either directly or by way of one or more intervening devices or components. In an embodiment, a communicative connection includes electrically connecting an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical coupling, or the like. In one or more embodiments, a communicative connection may be wireless and/or wired. For example, controller 140 may be communicative with clutches via a controller area network (CAN) communication.

In one or more embodiments, controller may include a flight controller (shown in FIG. 3), computing device, a central processing unit (CPU), a microprocessor, a digital signal processor (DSP), an application specific integrated circuit (ASIC), a control circuit, a combination thereof, or the like. In one or more embodiments, signals, such as datum from a pilot control or controller, may be analog or digital. Controller may convert output signals from a pilot input to a usable form by the destination of those signals. The usable form of output signals from pilot input and through controller may be either digital, analog, a combination thereof, or an otherwise unstated form. Processing by controller may be configured to trim, offset, or otherwise compensate the outputs of sensors. Based on output of the sensors, controller may determine the output to send to a downstream component. Controller may perform signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

In one or more embodiments, controller may include a timer that works in conjunction to determine regular intervals. In other embodiments, controller may continuously update datum provided by pilot input via a pilot control. Furthermore, data from pilot control and/or pilot input may be continuously stored on a memory component of controller. A timer may include a timing circuit, internal clock, or other circuit, component, or part configured to keep track of elapsed time and/or time of day.

Controller may be designed and/or configured to perform any method, method step, or sequence of method steps in any embodiment described in this disclosure, in any order and with any degree of repetition. For instance, controller may be configured to perform a single step or sequence repeatedly until a desired or commanded outcome is achieved. Repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Controller 140, as well as any other components or combination of components, may be connected to a controller area network (CAN), which may interconnect all components for signal transmission and reception.

In one or more embodiments, controller may receive a command from a pilot via, for example, a pilot input that indicates when a clutch should be engaged and when one or more electrical components should be operating. In one or more embodiments, a pilot control is configured to receive a pilot input, where controller may receive the pilot input and then generate an attitude command to control one or more flight components of aircraft 144. In one or more embodiments, pilot control may be configured to control an operation of electric motors 108,112. Pilot control may include a pilot interfacing component. The pilot interfacing component may be an inceptor stick, collective pitch control, brake pedals, pedal controls, steering wheel, button, throttle lever, toggles, joystick, or control wheel. One of ordinary skill in the art, upon reading the entirety of this disclosure would appreciate the variety of input controls that may be present in an aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Additionally, or alternatively, pilot input may include one or more data sources providing raw data. "Raw data", for the purposes of this disclosure, is data representative of aircraft information that has not been conditioned, manipulated, or processed in a manner that renders data unrepresentative of aircraft information. In exemplary embodiments, pilot input may be provided by a pilot or an automation system. Pilot input may be exterior sensor data, interior sensor data, data retrieved from one or more remotely or onboard computing devices. Pilot input may include audiovisual data, pilot voice data, biometric data, or a combination thereof. Pilot input may include information or raw data gathered from gyroscopes, inertial measurement units (IMUs), motion sensors, a combination thereof, or another sensor or grouping of sensors. Pilot control may be physically located in the cockpit of aircraft 144 or remotely located outside of aircraft 144 in another location communicatively connected to at least a portion of aircraft 144.

In one or more embodiments, by a pilot control, a pilot may engage or disengage a clutch to have one or more motors power flight component 104. For example, and without limitation, first motor 124 may have received a pilot command from a pilot via a pilot control of electric aircraft 144, such as a throttle actuation indicating a desired motor speed increase. Pilot may determine, using datum provided by controller or other flight systems, that motor 124 did not operate according to the received pilot command. Subsequently, pilot may determine that motor is inoperative, such as for example, if first motor 124 does not move in response to the pilot command. As a result, pilot may, via controller and/or pilot control, transmit a signal to the other motor, such as second motor 128 to move the flight component instead. For example, second motor 128 may engage shaft 140 and rotate shaft 140 about longitudinal axis A to provide motive power to flight component 104, such as propeller, so that flight component 104 moves as intended by the pilot command of the pilot. Therefore, second motor 128 provides redundancy such that, if first motor 128 fails, flight component 104 may remain operational as second motor 128 continues to move flight component 104. System redundancies performed by controller and/or motors 124,128 may include any systems for redundant flight control as described in U.S. nonprovisional application Ser. No. 17/404,614, filed on Aug. 17, 2021, and entitled "SYSTEMS AND METHODS FOR REDUNDANT FLIGHT CONTROL IN AN AIRCRAFT," the entirety of which is incorporated herein by reference.

Still referring to FIG. 1B, system 100 may include a sensor configured to detect a condition characteristic of system 100 and/or components thereof. For example, and without limitation, sensor may detect a condition characteristic of motors 124,128. In one or more exemplary embodiments, a sensor may include a first sensor 156 communicatively connected to first motor 124, and a second sensor 160 communicatively connected to second motor 128. As used in this disclosure, a "sensor" is a device that is configured to detect an event and/or a phenomenon and transmit information and/or data related to the detection. For instance, and without limitation, a sensor may transform an electrical and/or physical stimulation into an electrical signal that is suitable to be processed by an electrical circuit, such as controller. A sensor 156 may generate a sensor output signal, which transmits information and/or datum related to a detection by the sensor. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio.

In one or more nonlimiting embodiments, each motor 124,128 may include or be connected to one or more sensors detecting one or more characteristics of motors 124,128. One or more characteristics may include, without limitation, voltage levels, electromotive force, current levels, temperature, current speed of rotation, position sensors, torque, and the like. For instance, and without limitation, one or more sensors may be used to detect torque, or to detect parameters used to determine torque, as described in further detail below. One or more sensors may include a plurality of current sensors, voltage sensors, speed or position feedback sensors, such as encoders, and the like. A sensor may communicate a current status and/or condition of motor to a person operating system, such as a pilot, or controller. Controller may include a computing device, where computing device may include any computing device as described in this disclosure, including without limitation, a controller, a processor, a microprocessor, a control circuit, a flight controller, or the like. In one or more embodiments, computing device may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described herein.

In one or more embodiments, each sensor 156,160 may detect a condition characteristic, such as position, displacement, and/or speed, of a component of each electric motor 108,112, such as motor 124,128, respectively. For the purposes of this disclosure, a "condition characteristic" is a physical or electrical phenomenon associated with an operation and/or condition of system and/or any component thereof, such as electric motor. In one or more nonlimiting embodiments, a sensor of system 100 may generate failure data as a function of condition characteristic and transmit the failure data to controller. For example, and without limitation, each sensor 156,136 may transmit an output signal that, for example, includes failure data to controller. For the purposes of this disclosure, "failure data" is an electrical signal representing information related to a motor characteristic of an electric motor and/or components thereof that indicates a motor malfunction or failure, such as inoperativeness of a motor. Based on the failure data, controller may generate a command to alter an operation of one of the electric motors based on the failure and/or malfunction of the other electric motor. For example, and without limitation, if failure data of first motor 124 is transmitted to controller, then controller may alter an operation of second motor 128, such as increasing an RPM of second motor 128.

In one or more embodiments, each sensor may include a plurality of sensors in the form of individual sensors or a sensor suite working in tandem or individually. A sensor suite may include a sensor array having a plurality of independent sensors, where any number of the described sensors may be used to detect any number of physical or electrical quantities associated with an electric vehicle. For example, sensor suite may include a plurality of sensors where each sensor detects the same physical phenomenon. Independent sensors may include separate sensors measuring physical or electrical quantities that may be powered by and/or in communication with circuits independently, where each may signal sensor output to a control circuit such as a user graphical interface. In a non-limiting example, there may be a plurality of sensors housed in and/or on electric vehicle and/or components thereof, such as battery pack of electric aircraft, measuring temperature, electrical characteristic such as voltage, amperage, resistance, or impedance, or any other parameters and/or quantities as described in this disclosure. In one or more embodiments, use of a plurality of independent sensors may also result in redundancy configured to employ more than one sensor that measures the same phenomenon, those sensors being of the same type, a combination of, or another type of sensor not disclosed, to detect a specific characteristic and/or phenomenon.

In one or more embodiments, sensor may include an electrical sensor. An electrical sensor may be configured to measure a voltage across a component, electrical current through a component, and resistance of a component. In one or more non-limiting embodiments, an electrical sensor may include a voltmeter, ammeter, ohmmeter, and the like. For example, and without limitation, an electrical sensor may measure power from a power source of an electric aircraft being provided to a motor.

In one or more embodiments, sensor may include a temperature sensor. In one or more embodiments, a temperature sensor may include thermocouples, thermistors, thermometers, infrared sensors, resistance temperature sensors (RTDs), semiconductor based integrated circuits (IC), and the like. "Temperature", for the purposes of this disclosure, and as would be appreciated by someone of ordinary skill in the art, is a measure of the heat energy of a system. Temperature, as measured by any number or combinations of sensors present, may be measured in Fahrenheit (° F.), Celsius (° C.), Kelvin (° K), or another scale alone, or in combination.

Still referring to FIG. 1B, sensor may include a motion sensor. A motion sensor refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. A motion sensor may include, torque sensor, gyroscope, accelerometer, position, sensor, magnetometer, inertial measurement unit (IMU), pressure sensor, force sensor, proximity sensor, displacement sensor, vibration sensor, or the like.

In one or more nonlimiting embodiments, sensor may include various other types of sensors configured to detect a physical phenomenon of electric motors 108,112, such as, for example, each sensor 156,160 may use various types of sensor to detect a physical phenomenon of each motor 124,128, respectively. For instance, and without limitation, each sensor 156,136 may include photoelectric sensors, radiation sensors, infrared sensors, and the like. Each sensor 156,136 may include contact sensors, non-contact sensors, or a combination thereof. In one or more embodiments, each sensor 156,136 may include digital sensors, analog sensors, or a combination thereof. Each sensor 156,136 may include digital-to-analog converters (DAC), analog-to-digital converters (ADC, A/D, A-to-D), a combination thereof, or other signal conditioning components used in transmission of measurement data to a destination, such as controller 140, over a wireless and/or wired connection.

In one or more embodiments, sensor may include an encoder. In one or more nonlimiting embodiments, first motor 124 may include a first encoder, and first motor 128 may include a second encoder. In one or more embodiments, each encoder may be configured to detect a rotation angle of a motor, where the encoder converts an angular position and/or motion of a shaft of each motor 124,128, respectively, to an analog and/or digital output signal. In some cases, for example, each encoder may include a rotational encoder and/or rotary encoder that is configured to sense a rotational position of a pilot control, such as a throttle level, and/or motor component; in this case, the rotational encoder digitally may sense rotational "clicks" by any known method, such as without limitation magnetically, optically, and the like. In one or more embodiments, encoders may include a mechanical encoder, optical encoder, on-axis magnetic encoder, and/or an off-axis magnetic encoder. In one or more embodiments, an encoder includes an absolute encoder or an incremental encoder. For example, and without limitation, encoders may include an absolute encoder, which continues to monitor position information related to corresponding motors 124,128 even when encoders are no longer receiving power from, for example, a power source of electric aircraft 144. Once power is returned to encoders, encoders may provide the detected position information to a controller. In another example, and without limitation, encoder may include an incremental encoder, where changes in position of motor are monitored and immediately reported by the encoders. In one or more embodiments, encoders may include a closed feedback loop or an open feedback loop. In one or more exemplary embodiments, an encoder is configured to determine a motion of a motor, such as a speed in revolutions per minute of the motor. An encoder may be configured to transmit an output signal, which includes feedback, to a controller and/or motor; as a result, the motor may operate based on the received feedback from the encoder. For example, and without limitation, a clutch of a motor may engage a shaft of system 100 if the motor is determined to be operational based on feedback from a corresponding encoder. However, if a motor is determined to be inoperative based on feedback from a corresponding encoder, then a clutch of the motor may be disengaged form the shaft so that the other motor may engage the shaft and provide motive power to the flight component attached to the shaft.

Referring now to FIG. 2, an exemplary embodiment of an electric aircraft 144 is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 144 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. nonprovisional application Ser. No. 16/603,225, filed on Dec. 4, 2019, and entitled "AN INTEGRATED ELECTRIC PROPULSION ASSEMBLY," the entirety of which is incorporated herein by reference.

As used in this disclosure, a vertical take-off and landing (eVTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

With continued reference to FIG. 2, a number of aerodynamic forces may act upon the electric aircraft 144 during flight. Forces acting on an electric aircraft 144 during flight may include, without limitation, thrust, the forward force produced by the rotating element of the electric aircraft 144 and acts parallel to the longitudinal axis. Another force acting upon electric aircraft 144 may be, without limitation, drag, which may be defined as a rearward retarding force which is caused by disruption of airflow by any protruding surface of the electric aircraft 144 such as, without limitation, the wing, rotor, and fuselage. Drag may oppose thrust and acts rearward parallel to the relative wind. A further force acting upon electric aircraft 144 may include, without limitation, weight, which may include a combined load of the electric aircraft 144 itself, crew, baggage, and/or fuel. Weight may pull electric aircraft 144 downward due to the force of gravity. An additional force acting on electric aircraft 144 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 144 are designed to be as lightweight as possible. Reducing the weight of the aircraft and designing to reduce the number of components is essential to optimize the weight. To save energy, it may be useful to reduce weight of components of an electric aircraft 144, including without limitation propulsors and/or propulsion assemblies. In some embodiments, electric aircraft 144 may include at least on vertical propulsor 204. In an embodiment, electric aircraft 144 may include at least one forward propulsor 208. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 144 and/or propulsors.

In one or more embodiments, a motor of electric aircraft 144, which may be mounted on a structural feature of an aircraft. Design of motors 124,128 may enable them to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft 144. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 104. Persons skilled in the art, upon reviewing the entirety of this disclosure, will be aware of various materials, combinations of materials, and/or constructions techniques.

Figure 3:
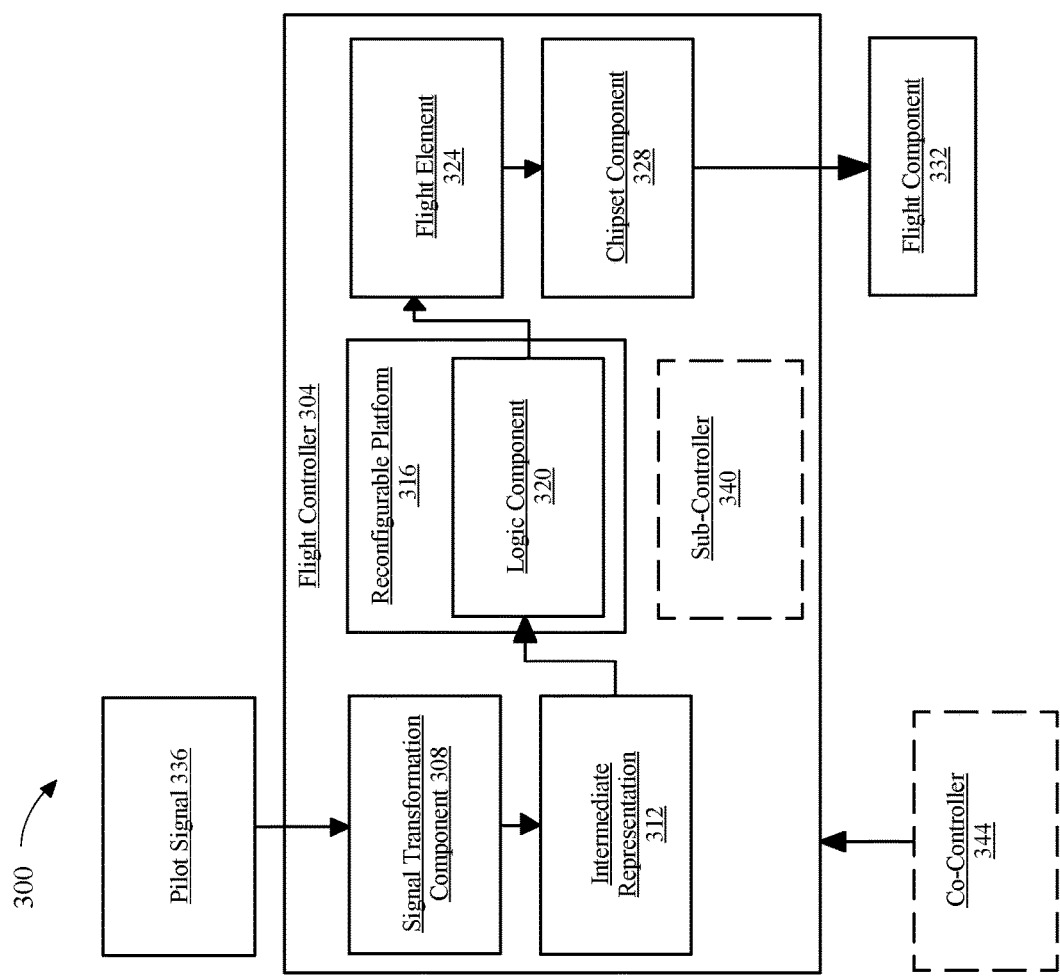
FIG. 3 is an illustration of a boom with an exemplary embodiment of the two-motor propulsions system disposed therein in accordance with one or more embodiments of the present disclosure.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function be part of an autopilot mode where an autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine-learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor, and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
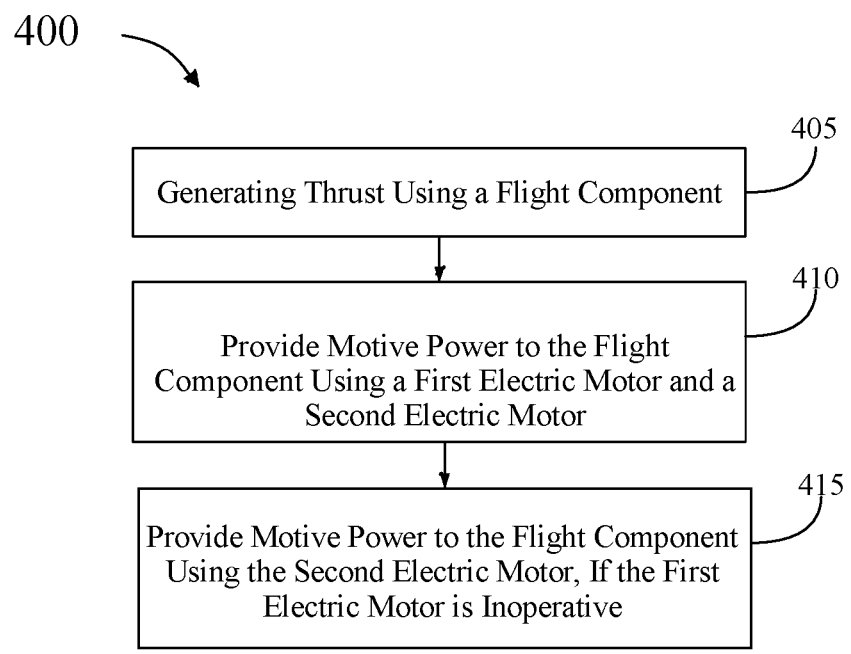
FIG. 4 is a flow diagram illustrating a method of using an electric aircraft having a two-motor propulsion system.

Referring now to FIG. 4, a flow diagram is shown illustrating a method 400 of using an electric aircraft having a two-motor propulsion system. At step 405, method 400 may include generating thrust, using a flight component attached to electric aircraft. Electric aircraft may include any electric aircraft described in this disclosure, including with reference to FIGS. 1-3. Flight component may include any flight component described in this disclosure, including with reference to FIGS. 1-3.

With continued reference to FIG. 4, at step 410, method 400 may include providing motive power to flight component, using a first electric motor and a second electric motor. First electric motor and second electric motor may include any electric motor described in this disclosure, including with reference to FIGS. 1-3.

With continued reference to FIG. 4, at step 415, method 400 may include providing motive power to flight component, using second electric motor, if first electric motor is inoperative. Inoperative conditions may include any inoperative conditions described in this disclosure, including with reference to FIGS. 1-3.

Still referring to FIG. 4, in some embodiments, method 400 may additionally include generating, using a controller communicatively connected to each of first electric motor and second electric motor, at least a command and transmitting, using the controller, the at least a command to the first electric motor and the second electric motor. Controller may include any controller described in this disclosure, including with reference to FIGS. 1-3.

Still referring to FIG. 4, in some embodiments, method 400 may additionally include powering first electric motor, using a first inverter electrically connected to the first motor, powering second electric motor, using a second inverter electrically connected to the second motor, communicatively connecting controller to the first electric motor by way of the first inverter, and communicatively connecting the controller to the second electric motor by way of the second inverter. First inverter and second inverter may include any inverter described in this disclosure, including with reference to FIGS. 1-3.

Still referring to FIG. 4, in some embodiments, electric aircraft may include a shaft, having a longitudinal axis, attached to flight component, and first electric motor and second electric motor are located concentric to the longitudinal axis. In some cases, method may additionally include rotating shaft about longitudinal axis, using one or more of first electric motor and second electric motor. Shaft may include any shaft described in this disclosure, including with reference to FIGS. 1-3.

Still referring to FIG. 4, in some embodiments, method 400 may additionally include, further comprising air cooling one or more of the first electric motor and the second electric motor. Air cooling may include any air cooling described in this disclosure, including with reference to FIGS. 1-3.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft having a two-motor propulsion system, the electric aircraft comprising:
   a flight component attached to the electric aircraft, wherein the flight component is configured to generate thrust;
   a controller communicatively connected to each of the first electric motor and the second electric motor and configured to generate at least a command to the first electric motor and the second electric motor;
   a sensor comprising an on-axis magnetic encoder configured to output a closed feedback loop signal indicating motor position and operativity to the controller;
   a first electric motor and a second electric motor attached to a shaft by way of a first clutch and second clutch, respectively, wherein:
      the shaft is attached to the flight component;
      each of the first electric motor and the second electric motor are mechanically connected to the flight component and configured to provide motive power to the flight component;
      the second electric motor is able to provide motive power to the flight component when the first electric motor is inoperative; and
      the controller is configured to control at least one of the first clutch and the second clutch to engage the shaft based on the closed feedback loop signal from the on-axis magnetic encoder;
   a first battery pack connected to the first electric motor, the first battery pack configured to provide energy to the first electric motor; and
   a second battery pack connected to the second electric motor, the second battery pack configured to provide energy to the second electric motor.

2. The electric aircraft of claim 1, further comprising:
   a first inverter electrically connected to and configured to power the first electric motor;
   a second inverter electrically connected to and configured to power the second electric motor; and
   wherein the controller is communicatively connected to the first electric motor by way of the first inverter and the second electric motor by way of the second inverter.

3. The electric aircraft of claim 1, further comprising a sensor communicatively connected to the controller, the first electric motor, and the second electric motor, wherein the sensor is configured to:
   detect that the first electric motor is inoperative; and
   generate a failure data corresponding to the inoperativeness of the first electric motor.

4. The electric aircraft of claim 1, wherein the sensor comprises:

a first on-axis magnetic encoder communicatively connected to the first electric motor and the controller; and a second on-axis magnetic encoder communicatively connected to the second electric motor and the controller.

5. The electric aircraft of claim 1, wherein:

the at least a command comprises an electrical signal; and one or more of the first electric motor or the second motor are configured to convert the electrical signal to a mechanical movement of the flight component.

6. The electric aircraft of claim 1, wherein the flight component comprises a lift propulsor configured to provide lift.

7. The electric aircraft of claim 1, wherein the flight component comprises a thrust propulsor configured to provide longitudinal thrust.

8. The electric aircraft of claim 7, wherein the shaft has a longitudinal axis, wherein the first electric motor and the second electric motor are located concentric to the longitudinal axis and are configured to rotate the shaft about the longitudinal axis.

9. The electric aircraft of claim 8, wherein the first motor and the second motor are stacked.

10. The electric aircraft of claim 1, further comprising an electric vertical take-off, vertical landing (eVTOL) aircraft.

11. The electric aircraft of claim 1, wherein one or more of the first electric motor and the second electric motor are air cooled.

12. A method of using an electric aircraft, the method comprising:

generating thrust, using a flight component attached to the electric aircraft;

providing power to a first electric motor using a first battery pack coupled to the first electric motor;

providing power to a second electric motor using a second battery pack coupled to the second electric motor;

generating at least a command to the first electric motor and the second electric motor based on a closed feedback loop signal from an on-axis magnetic encoder;

providing motive power to the flight component, using the first electric motor and the second electric motor attached to a shaft by way of a first clutch and second clutch, respectively;

wherein at least one of the first clutch and the second clutch are engaged with the shaft based on the closed feedback loop signal from the on-axis magnetic encoder;

and providing motive power to the flight component, using the second electric motor, when the first electric motor is inoperative and disengaged with the shaft.

13. The method of claim 12, further comprising:

generating, using a controller communicatively connected to each of the first electric motor and the second electric motor, at least a command; and transmitting, using the controller, the at least a command to the first electric motor and the second electric motor.

14. The method of claim 13, further comprising:

powering the first electric motor, using a first inverter electrically connected to the first motor;

powering the second electric motor, using a second inverter electrically connected to the second motor;

communicatively connecting the controller to the first electric motor by way of the first inverter; and communicatively connecting the controller to the second electric motor by way of the second inverter.

15. The method of claim 12, wherein the electric aircraft further comprises a shaft, having a longitudinal axis, attached to the flight component, and the first electric motor and the second electric motor are located concentric to the longitudinal axis; and the method further comprises rotating the shaft about the longitudinal axis, using one or more of the first electric motor and the second electric motor.

16. The method of claim 12, further comprising air cooling one or more of the first electric motor and the second electric motor.

* * * * *